July 23, 1963 J. W. SCHAEFER 3,098,397
TENSION CONTROL APPARATUS
Filed March 31, 1961
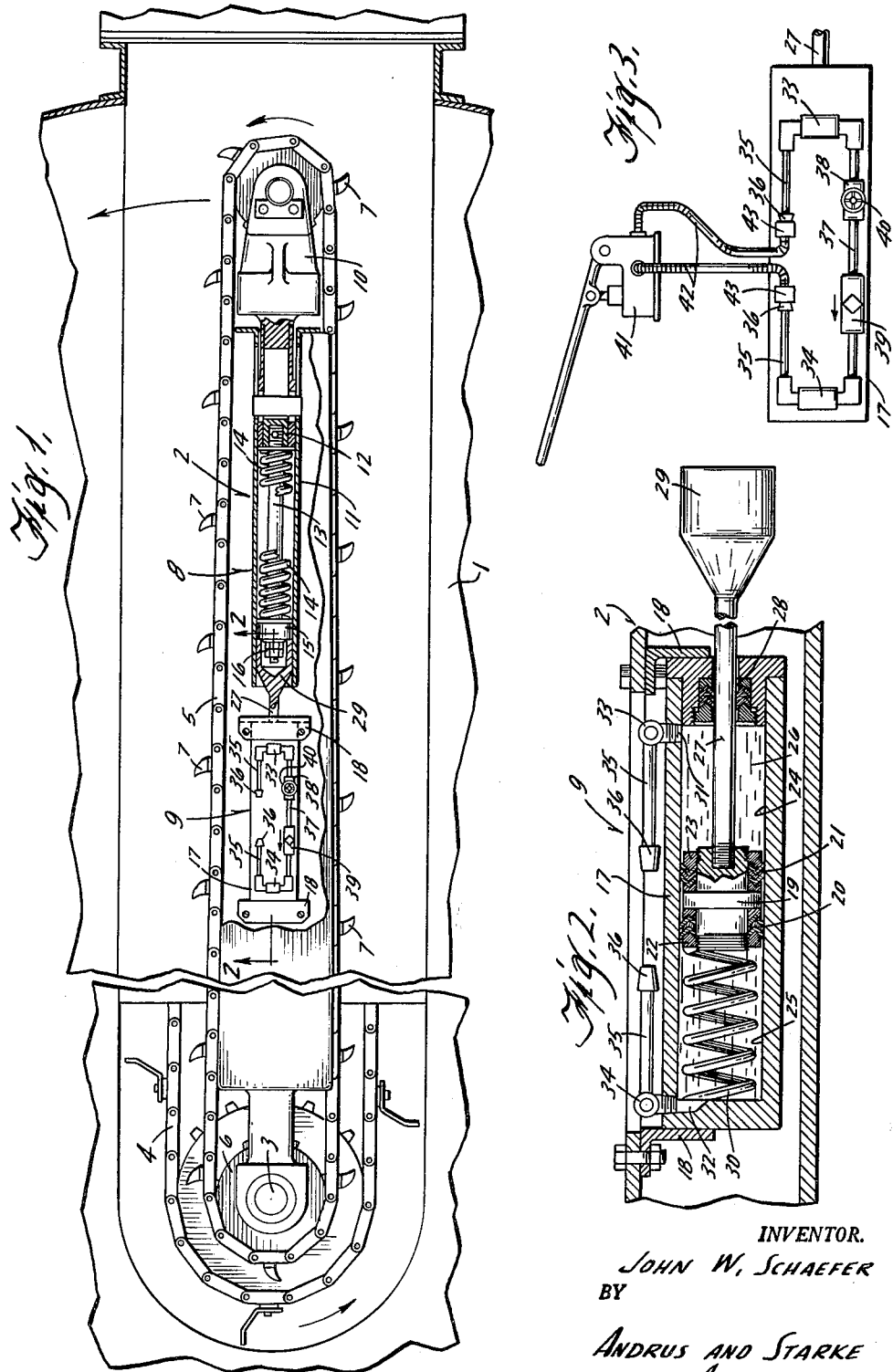
INVENTOR.
JOHN W. SCHAEFER
BY
ANDRUS AND STARKE
ATTORNEYS.

United States Patent Office 3,098,397
Patented July 23, 1963

3,098,397
TENSION CONTROL APPARATUS
John W. Schaefer, Kankakee, Ill., assignor to A. O. Smith Corporation, Milwaukee, Wis., a corporation of New York
Filed Mar. 31, 1961, Ser. No. 99,763
5 Claims. (Cl. 74—242.14)

This invention relates to tension control apparatus and particularly to a tension control apparatus adapted to be incorporated into a tension and cushioning member for an endless chain or belt drive.

The tensioning apparatus of the present invention is particularly adapted for incorporation into a bottom silo unloader such as shown in the applicant's copending application for a Tightening and Cushioning Device for Endless Driven Members, which was filed on December 31, 1959 with Serial No. 863,302, now patent No. 3,007,344, and which is assigned to a common assignee herewith. In a bottom silo unloader a radial cutter arm may be centrally mounted in the floor for rotation within the storage structure. The arm carries an endless chain having suitable laterally projecting cutters adapted to cut into the stored material and discharge it into the discharge hopper. It is important that the chain be kept taut and that the cutter arm be expandable to compensate for wear or the like in the chain.

Generally, a coil spring mechanism or the like is provided for cushioning the outer end of the arm and allowing the arm to move under the spring action to absorb chordal and other shock forces arising during normal operation of the unit. The above patent application previously referred to further includes a tensioning device coupled to the chain through the cushioning mechanism to continuously maintain the chain in a taut condition upon occurrence of abnormal wear of the unit.

The present invention is directed to a long life and reliable hydraulic tensioning unit including means to allow simple and ready retraction of the cutter arm and disassembly of the unloader structure for repair, parts replacement and the like. The present invention further provides a continuous constant application of pressure to the chain and provides a particularly desirable means for cushioning against excessive recoil after the action of a normal cushioning means is completely taken up.

In accordance with the present invention, a resiliently actuated hydraulic piston and cylinder unit is provided with one of the members stationarily mounted and the other member interconnected and resiliently biased to place the endless member under tension and a taut condition. The members expand to absorb wear and stretch in the endless member and thus maintain the taut state of the endless member. The hydraulic piston divides the associated cylinder into a forward chamber and a rear chamber. A one-way or check valve interconnects the chambers and allows fluid flow therethrough only in the direction to take up slack in the endless member for maintaining the endless member under tension. The fluid in the hydraulic cylinder is thereby locked and reverse movement of the moveable member is prevented. The hydraulically locked member prevents excessive recoil.

Means are provided for disenabling of the check valve such that the movable member can be retracted with respect to the endless member to permit service and replacement.

The drawing furnished herewith illustrates the best mode presently contemplated for carrying out the invention.

In the drawing:

FIGURE 1 is a top elevational view of a cutter arm secured within a silo or the like;

FIG. 2 is an enlarged fragmentary vertical section taken on line 2—2 of FIGURE 1; and FIG. 3 is a top fragmentary elevational view of the cutter shown in FIGURE 1 and a hydraulic pump interconnected to the cutter arm for permitting chain service and the like.

Referring to the drawing and particularly to FIGURE 1, an unloader structure is shown in accordance with the present invention mounted within a storage structure 1 of which only a small fragmentary portion is illustrated. The unloader structure generally includes a cutter arm 2 which is secured at one end to a central bearing hub 3 centrally of the storage structure 1. A drive and discharge chain 4 is rotatably mounted beneath the hub 3 and coupled to a drive, not shown, to rotate the hub and thus the attached cutter arm 2 about the vertical axis of the hub. In this manner the cutter arm 2 continuously sweeps across the bottom of the structure 1. An endless cutter chain 5 formed of a series of pivotally interconnected links encircles the cutter arm 2 and is driven by a sprocket 6 on hub 3. Material cutters 7 are secured to chain 5 and project laterally therefrom. As the arm 2 is caused to sweep over the floor of the structure 1, the chain 5 continuously moves about the arm 2. Cutter 7 loosens and carries the store material, not shown, into the opening adjacent the hub 3 for discharging of the material by the unloader.

Generally, the cutter arm 2 shown in FIGURE 1 is similar to the cutter arm shown in the previously referred to copending application and includes a cushioning assembly 8 and a takeup or tensioning assembly 9 mounted within the outer end of the cutter arm 2 to bias a chain fork 10 outwardly. The fork 10 is telescopically secured to the outer end of the arm 2 to support and carry the adjacent portion of the chain 5 as it circles the cutter arm 2.

The cushioning assembly 8 is secured in the outermost end of the arm 2 and is connected to the fork 10 to establish a control and constant recoil for shock loads which arise due to chordal action of the chain and the like.

The tensioning assembly 9 is secured to the backside of cushioning assembly 8 and takes up any slack in the chain 5 which arises as a result of wear, stretch or the like and thereby maintains the chain 5 in a selected taut condition.

The illustrated cushioning assembly 8 corresponds to the cushioning assembly shown in the applicant's copending application previously referred to. Generally, the cushioning assembly 8 includes a cylindrical housing 11 which is immovably secured within the forward end of the cutter arm 2. A piston 12 is slidably journaled within the housing 11 and attached to the fork 10 to continuously reposition the fork in accordance with the movement of the chain 5. A piston shaft 13 extends rearwardly within the housing 11 with a helical compression spring 14 encircling the shaft 13 between a sliding collar 15 and the facing end of the piston 12. The collar 15 is secured to the back end of the piston shaft 13 by a pair of suitable lock nuts 16 or the like. The position of the collar 15 within the housing 11 is controlled by tensioning assembly 9, as hereinafter described, to form a relatively fixed support for the adjacent end of compression spring 14.

Generally, any inward force on the fork 10 due to the chordal action of the chain 5 or the like results in inward movement of the fork 10 and the attached piston 12. The spring 14 is compressed to absorb the shock force. When the force is removed, the spring 14 expands and forces the fork 10 outwardly to maintain the chain in the normal taut condition. As the chain 5 wears or stretches, the expansion of spring 14 is insufficient to tighten the chain and the tensioning assembly 9 is actuated to reposition the collar 15 and through cushioning assembly 8 maintain tautness of chain 5.

The illustrated tensioning assembly 9 forming an embodiment of the present invention, is a spring activated hydraulic unit including a cylinder 17 secured within the cutter arm 2 immediately inwardly of the cushioning unit 8 by suitable L-shaped brackets 18. A piston 19 is slidably disposed within the cylinder 17 and is provided with axially displaced piston sealing rings 20 and 21 of suitable flexible material. The rings 20 and 21 are secured on the opposite reduced ends of the piston 19 by suitable lock rings 22 and 23, respectively, which are threaded onto the corresponding threaded ends of the piston. The piston 19 divides the cylinder 17 into a front chamber 24 and a rear chamber 25 which are filled with oil 26 or any other suitable substantially incompressible fluid. A piston rod 27 is threadedly secured to the forward end of the piston 19 and extends outwardly through a sealed opening 28 in the front wall of the cylinder 17. The piston rod 27 terminates in an enlarged tubular portion 29 which extends over the lock nuts 16 and bears upon the backside of the collar 15. A coil spring 30 is disposed within the rear chamber 25 and acts between the back wall of the cylinder 17 and the piston 19 to continuously urge the piston rod 27 outwardly into engagement with the collar 15.

A forward oil port 31 and a rear oil port 32 are formed in the top wall of the cylinder 17 immediately adjacent the front and the rear walls of the cylinder. Connecting T's 33 and 34 are respectively secured in the ports 31 and 32.

Service conduits 35 are secured to corresponding outlet portions of the connecting T's 33 and 34 and terminate in normally closed coupling jacks 36, for purposes more fully described hereinafter.

An operating conduit 37 interconnects the opposite discharge openings of the connecting T's 33 and 34. A service valve 38 and an operating check valve 39 are serially interposed into the operating conduit 37.

The service valve 38 is provided with a manually actuated handle 40 to allow selective opening and closing of the valve. In the normal operation of the tensioning assembly 9, the service valve 38 is open.

The check valve 39 allows oil to flow only from the forward chamber 24 into the rear chamber 25. Consequently, the piston 19 and piston rod 27 are allowed to move outwardly of the cylinder 17 toward the cushioning assembly 8 but are hydraulically restrained against opposite or relatively inward movement.

In the operation of the illustrated cutter arm, the cushioning assembly 8 absorbs all normal recoil of the movable fork 10 and the chain 5. However, when the spring 14 is completely compressed, the force is transmitted through the collar 15 and the piston rod 27 to the piston 19 of the tensioning assembly 9. The fluid in the hydraulic cylinder 17 is trapped within the rear chamber 25 and hydraulically locks the piston 19 against movement and eliminates the dimensional translation of abnormal recoil forces which may occur.

As the chain 5 wears or is stretched, and thus lengthens, the spring 30 forces the piston 19 toward the front of cylinder 17. The piston rod 27 moves outwardly and repositions the collar 15 forwardly in accordance with the lengthening of the chain. The oil 26 in the forward chamber 24 flows through the interconnecting conduit 37 including the check valve 39 and into the rear chamber 25 to maintain chamber 25 filled as the piston 19 moves forwardly.

Referring particularly to FIG. 3, the means for servicing the cutter arm 2 is illustrated. The service valve 38 is closed by actuation of handle 40. A hydraulic pump 41 includes a pair of flexible conduits 42 terminating in connect coupling sockets 43 releasably coupled with the normally closed jacks 36. The hydraulic pump 41 is actuated to transfer oil 26 from the rear chamber 25 to the front chamber 24 and to thus cause the piston 19 and piston rod 27 to move rearwardly into the cylinder 17. Consequently, the enlarged end 29 of the piston rod 27 moves away from the collar 15 and allows the fork 10 to be moved completely inwardly for ready removal of the chain 5. The pump 41 may then be removed by removing the sockets 43 from the jacks 36.

After the required service is completed, the chain is placed back into position and the service valve 38 is opened. The compression spring 30 automatically forces the piston 19 and the piston rod 27 outwardly into positioning engagement with the collar 15. The spring 30 acts to reposition collar 15 and, therefore, the fork 10 into the normal operating condition.

The present invention provides a rugged reliable tensioning assembly employing a self-contained hydraulic system including means permitting ready servicing and maintaining of the assembly and the associated equipment.

Various modes of carrying out the invention are contemplated as being within the scope of the following claims particularly pointing out and distinctly claiming the subject matter which is regarded as the invention.

I claim:

1. A tension control for an endless member, comprising a hydraulic unit having a tubular housing member and a piston member mounted therein, one of said members being generally immovably mounted and the other of said members being movably mounted in engagement with said endless member, resilient means coupled to the movable member to continuously place the endless member in tension, said piston member defining forward and rearward chambers within the housing member, a substantially incompressible liquid within said chambers, a passageway connecting said chambers, valve means in the passageway permitting liquid flow between the chambers only in one direction, said direction permitting the movement of said movably mounted member by said resilient means to maintain the endless member in tension, and normally inoperative means actuable to operatively disenable said valve means to allow opposite movement of the movable member.

2. In a cutter arm supporting a cutter chain and a cushioning device mounted within the cutter arm to resiliently tension the chain, a tensioning assembly coupled to position the cushioning device within the cutter arm comprising a cylinder secured within the cutter arm, a piston slidably mounted within the cylinder and dividing the cylinder into a forward and a rear chamber, a substantially incompressible liquid filling said chambers, a piston rod connected to the piston and extending forwardly into positioning engagement with the cushioning device, compressible means urging the piston in a direction to increase the tension of the chain, a forward oil port in the cylinder, a rear oil port in the cylinder, an operating line connecting said oil ports, a check valve in the operating line permitting oil flow from the front to the rear chamber only, and normally inoperative means to by-pass said check valve and serving to provide a conduit for oil flow from the rear chamber to the front chamber.

3. In a hollow cutter arm supporting a chain cutter and having a cushioning device movably mounted within the outer end of the cutter arm in operative engagement with the chain cutter, the combination with said cushioning device of a tension control which comprises a cylinder mounted within the arm inwardly of the cushioning device, a piston slidably mounted within the cylinder and dividing the cylinder into a forward and a rear chamber, oil filling said chambers, a piston rod connected to the piston and extending forwardly into positioning engagement with the cushioning device, compressible means urging the piston in a direction to increase the tension of the chain, a forward oil port in the cylinder, a rear oil port in the cylinder, a pair of T couplers connected one each in each of the ports, an operating conduit connecting outlet ends of the T couplers, a check valve in the operating conduit permitting oil flow from the front to the rear chamber only, a manually operated valve in said operating conduit, and a pair of conduits terminating in coupling members and secured one each to the third opening in the T couplers and serving to provide a conduit connection for oil flow from the rear chamber to the front chamber.

4. In a chain drive assembly having a hollow cutter arm supporting a movable endless chain and a cushioning device movably mounted within the cutter arm to resiliently support one portion of the chain, the combination of a tensioning unit comprising a cylinder secured within the cutter arm, a piston slidably mounted within the cylinder and dividing the cylinder into a forward and a rear chamber, a substantially incompressible liquid filling said chambers, a piston rod connected to the piston and extending forwardly into positioning engagement with the cushioning device, an operating conduit communicating with said chambers, a check valve in the operating conduit permitting the liquid to flow only from the front to the rear chamber, a manually operated valve in said operating conduit, and a liquid pump having an inlet connected to said rear chamber and an outlet connected to said front chamber to allow selective transfer of the liquid from the rear chamber to the front chamber.

5. In a chain drive assembly having a hollow cutter arm supporting a movable endless chain and a cushioning device movably mounted within the cutter arm to resiliently support one portion of the chain, the combination of a tensioning unit comprising a cylinder secured within the cutter arm, a piston slidably mounted within the cylinder and dividing the cylinder into a forward and a rear chamber, a substantially incompressible liquid filling said chambers, a piston rod connected to the piston and extending forwardly into positioning engagement with the cushioning device, an operating conduit communicating with said chambers, a check valve in the operating conduit permitting the liquid to flow only from the front to the rear chamber, a manually operated valve in said operating conduit, a pair of conduits secured at one end in communication with the respective chambers, normally closed valve means in the free ends of said pair of conduits, and a liquid pump having conduit means releasably connected to the free ends of said pair of conduits and holding said valve means open and operable to transfer the liquid from the rear chamber to the front chamber.

References Cited in the file of this patent
UNITED STATES PATENTS

| | | |
|---|---|---|
| 1,909,372 | McCollum et al. | May 16, 1933 |
| 2,132,721 | Clarke | Oct. 11, 1938 |